June 4, 1929.  W. C. BROADWELL  1,716,300
VEHICLE FENDER
Filed March 5, 1925  2 Sheets-Sheet 1
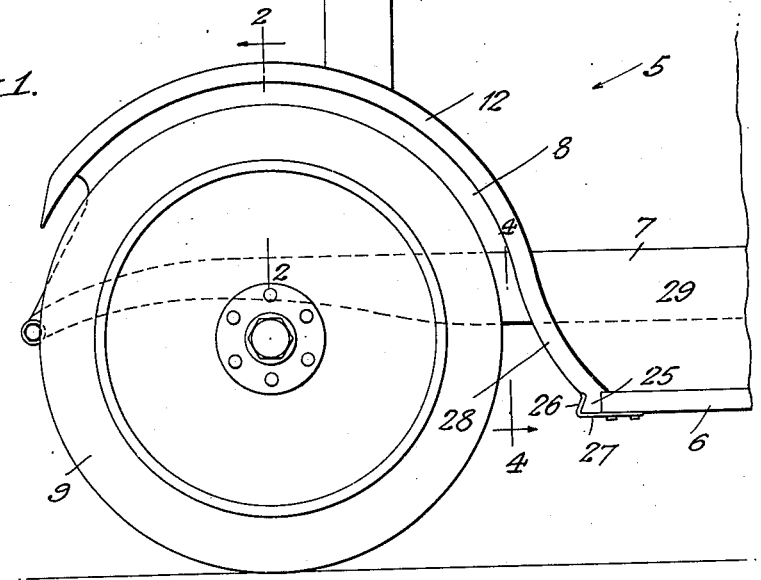
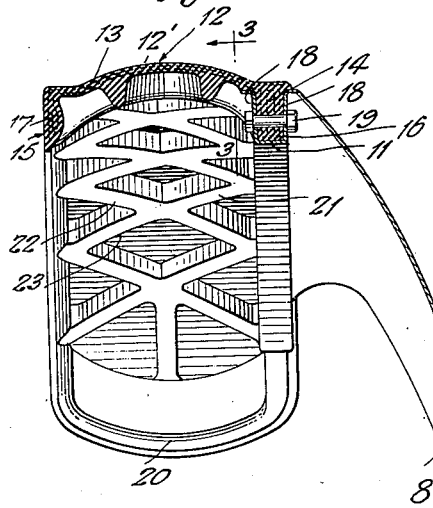
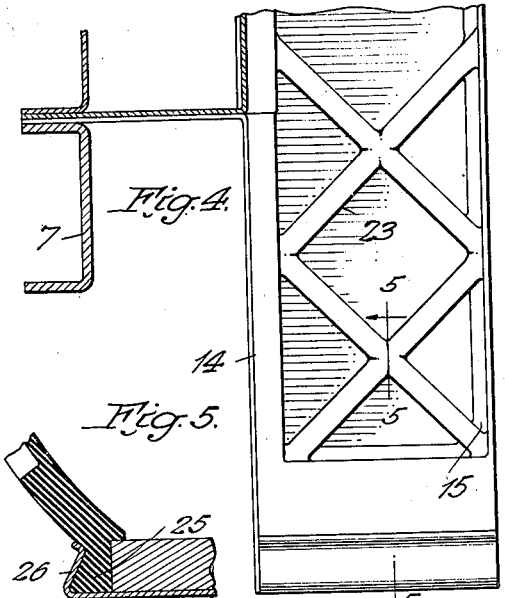
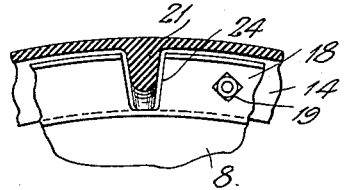
INVENTOR.
William C. Broadwell
BY Williams & Morse
ATTORNEYS

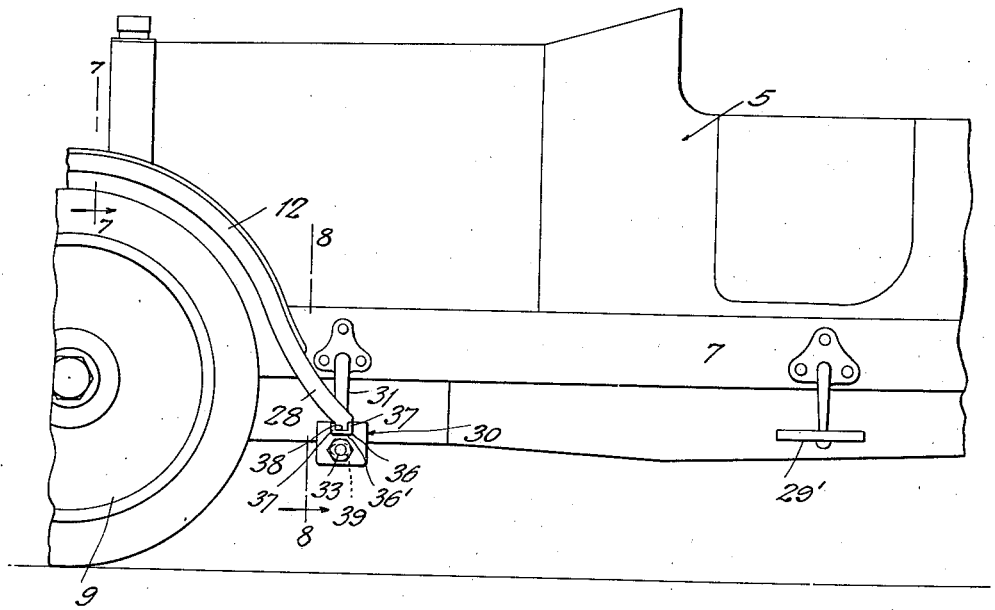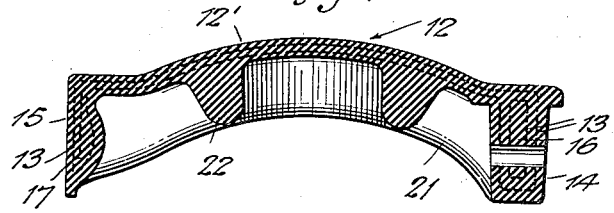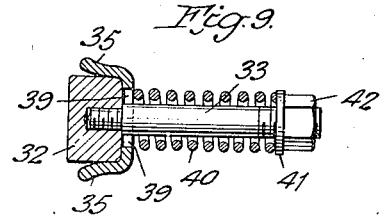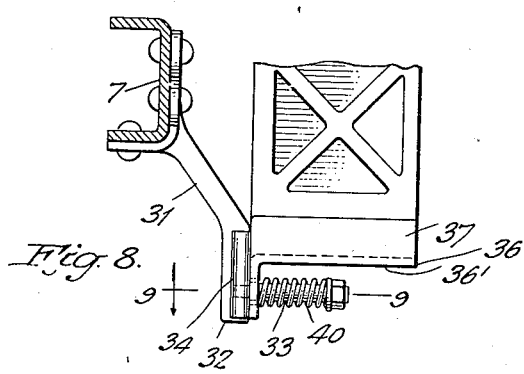

Patented June 4, 1929.

1,716,300

UNITED STATES PATENT OFFICE.

WILLIAM C. BROADWELL, OF BROOKLYN, NEW YORK.

VEHICLE FENDER.

Application filed March 5, 1925. Serial No. 13,037.

This invention relates to vehicle fenders and is herein shown as applied to an automobile although not restricted to such use.

An important object of the invention is to provide a fender so formed as to present an appearance simulating that of the usual or conventional designs but yet so constructed as to provide a yieldable, resilient and self-sustaining structure.

Other objects and certain advantages of the invention will become apparent from the following description when taken in connection with the accompanying drawings in which—

Figure 1 is a fragmental view in elevation of an automobile with which a fender embodying my invention is shown associated.

Figure 2 is a sectional view taken on line 2—2 of Figure 1.

Figure 3 is a sectional view taken on line 3—3 of Figure 2.

Figure 4 is a sectional view taken on line 4—4 of Figure 1.

Figure 5 is a sectional view taken on line 5—5 of Figure 4.

Figure 6 is a view similar to that of Figure 1, but showing a somewhat modified form of anchoring device for the free end of the fender.

Figure 7 is a somewhat enlarged transverse sectional view taken on line 7—7 of Figure 6.

Figure 8 is a detailed view taken on line 8—8 of Figure 6, showing certain constructional details of the modified form of anchoring device.

Figure 9 is a sectional view taken on line 9—9 of Figure 8.

In the drawings wherein for the purpose of illustration I have shown certain embodiments of my invention, the numeral 5 indicates an automobile provided with a running board 6 adapted to be suitably secured to and supported by the automobile frame 7. As usual, the automobile frame 7 carries a metallic guard 8 so shaped or curved as to form a gusset or shield intermediate the automobile wheel 9 and the automobile proper. This guard is provided with a flange 10 at its lower end, which flange is arranged upon the frame 7, as shown, and functions, in part, as a means for providing an adequate connection between the guard 8 and the automobile chassis. The guard, at its upper end, is so shaped as to provide a channel or groove 11 extending throughout the peripheral length of the guard. This channel not only reinforces the guard against undue strains but also provides a means for making possible an adequate connection of the fender 12 to the guard 8.

The fender 12 comprises a main body portion 12' which is constructed from rubber having layers of fabric 13 embedded therein and shaped to the general contour of the fender. In forming the fender, a pair of flanges 14 and 15 are provided. These flanges are reinforced by the fabric 13, by reason of the fact that the same is so incorporated into the structure as to provide stiffening beads 16 and 17. The flange 14, it will be noted, is adapted to be positioned within the groove or channel 11 and is secured or locked therein by means of a plurality of bolts passing through the flange 14 and the walls 18 of the channel, one of such bolts being shown in Figures 2 and 3 and indicated by the numeral 19. In order to lend a finished appearance to the fender in its entirety the flanges 15 and 14 are connected together by means of an intermediate flange 20 formed at the forward end of the fender. This latter named flange, as will be appreciated, also functions to reinforce the forward end of the fender against undue flexing.

In order to render the fender in its entirety self-sustaining and adequately reinforce the same against undue flexing without rendering the same non-yieldable and non-resilient, I provide a plurality of reinforcing ribs 21 and 22. These ribs are of rubber and are formed integral with the fender structure. The ribs 22, it will be noted, are formed integral with the flange 15 and project therefrom toward the center line of the fender where they connect with the ribs 21 which are formed integral with the flange 14. By reason of the converging relation maintained between the ribs 21 and 22, respectively, and by reason of the fact that these two sets of ribs are connected to each other along the center line of the fender, a plurality of diamond shaped reinforcing members 23 are in effect produced. These diamond-shaped members, by reason of the fact that their side ribs 21 and 22 converge from the central plane of the fender and are respectively secured to opposite flanges 14 and 15, are capable of lending sufficient rigidity to the fender without impairing the yieldability or resiliency of the same. Inasmuch as the ribs 21 are connected to each other and to the flange 14 and since the flange 14 is confined within the groove 11, it becomes necessary to cut away the outer wall 18 of the channel 11 to provide a recess 24 adapted to accommodate the ribs 21 at their respective points of connection to each other and to the flange 14.

From the foregoing it will become apparent that should the fender be subjected to undue impact, such as is often experienced in ordinary driving, the fender will yield as a result of its inherent flexibility and will thereafter, due to its inherent resiliency, spring back or return to its normal shape. A fender having such qualities or characteristics, possesses many advantages, as is obvious over the conventional type of metallic fenders for the reason that when metallic fenders are subjected to undue impacts and are thereby distorted or indented they do not return to their normal shape inasmuch as they lack the necessary flexibility and inherent resiliency.

Since the fender embodying my invention is constructed from rubber, it becomes desirable to provide a releasable means for securing the same to the running board 6, such releasable means being desirable in order to obviate possible tearing of the fender should the same be subjected to an undue impact from either the front or the rear in the vicinity of its connection to the running board. I have provided such a releasable connection by forming the lower or rear end of the fender with a flat depending lip or flange 25 which is confined intermediate the end of the running board and the upstanding resilient arm 26 of a metallic keeper 27. This keeper is suitably connected to the running board 6, and by reason of the fact that the arm 26 is more or less resilient and is inclined, as shown most clearly in Figure 5, the lip or flange 25 is consequently subjected to an impinging force at or relatively near its point of connection with the apron portion 28 of the fender. The apron portion 28, it will be noted, is free, that is to say, no provision is made for attaching the same to the usual guard or apron 29 extending from the frame 7 to the running board 6. If therefore, the apron 28 is subjected to an undue impact in the vicinity of its point of connection with the running board 6 the flange 25 is released from the keeper 27 and the apron is permitted to flex on a horizontal line coincident with the top of the frame 7 with the result that no damage is incurred by reason of the impact to which the apron was subjected.

Referring to Figures 6 to 9, wherein a modified form of the invention is disclosed in connection with an automobile employing the conventional form of step 29' rather than a running board, the numeral 30 indicates, as a whole, a novel form of means for anchoring the lower or rear end of the fender 12. This anchoring means is adapted to yield under such undue impacts as the same is likely to encounter in the absence of a running board, and comprises a bracket 31 adapted for connection with the automobile frame 7. The bracket 31 is provided with a depending arm 32 to which is secured a screw-threaded stud 33. Upon the arm 31 there is fitted an embracing member 34, the wings 35 of which slightly diverge as shown most clearly in Figure 9. This embracing member carries a laterally extending arm 36, provided with upstanding flanges 37 which form with the base 36' ot the arm, a groove or channel 38 into which the lip or flange 25 of the fender is adapted to fit. The embracing member 34 is provided with a relatively large opening 39 through which the stud 33 extends and is adapted to be retained in position upon the arm 32 by means of a compression spring 40 carried by the stud 33, the compression spring, at one end, being maintained in engagement with the embracing member 34 and at its other end in engagement with a washer 41 carried by the stud 33 and retained thereon by means of a nut 42 adapted to be adjusted longitudinally of the stud 33 to vary the compression of the spring.

From the construction of the anchoring means 30 it is obvious that the arm 36 is adapted to yield either laterally or vertically when subjected to an undue impact from either the front, rear, top or bottom. It will also readily appear that the apron portion 28 of the fender is adapted to be readily freed from the groove or channel 38 in the same manner as described in connection with the form of my invention shown in Figures 1 to 5, inclusive, thus obviating, under certain conditions, hereinbefore explained, the possibility of tearing or otherwise imparing the fender.

Having thus described my invention, I claim:—

1. A fender comprising a yieldable non-metallic body including rubber and fabric and adapted to yield under impact to a distorted contour, said body having inherent resiliency whereby the same is adapted to return from a distorted contour to a normal contour, fender-supporting means at the inner edge only of said body for supporting the same and reinforcing means including yieldable and resilient non-metallic ribs arranged transversely of and formed integral with said body for rendering the same normally self-sustaining.

2. A fender structure comprising a guard having a channel formed therein, a fender associated with said guard, said fender being provided with a flange arranged within said channel, means for securing said flange within said channel, and means for releasably anchoring one end of said fender.

3. In a vehicle fender structure, a guard having a channel formed therein, a fender associated with said guard and having a flange arranged within said channel, said fender being projected an appreciable distance beyond said channel and having a free end, and means for releasably anchoring said free end.

4. In a vehicle fender structure, a guard having a channel formed therein, a fender associated with said guard and having a flange arranged within said channel, said fender being projected an appreciable distance beyond said channel and having a free end, means for releasably anchoring said free end, and means for yieldably supporting said anchoring means.

In testimony whereof I have affixed my signature to this specification.

WILLIAM C. BROADWELL.